Oct. 27, 1925.
P. MÜLLER
1,559,122
METHOD OF CONNECTING ALTERNATING CURRENT COMMUTATOR MOTORS
Filed May 19, 1922
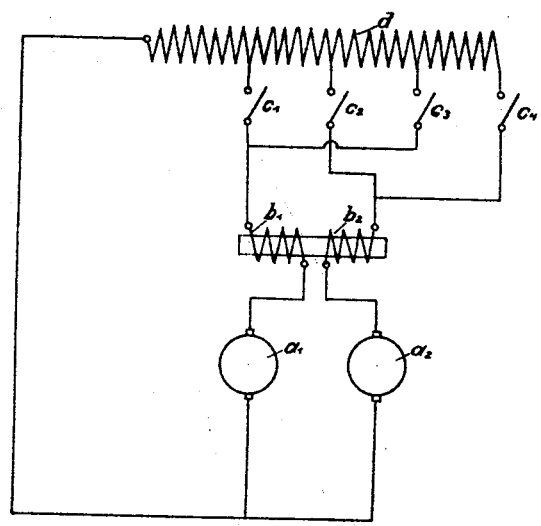
Inventor:

Patented Oct. 27, 1925.

1,559,122

UNITED STATES PATENT OFFICE.

PAUL MÜLLER, OF CHARLOTTENBURG, GERMANY, ASSIGNOR TO GENERAL ELECTRIC COMPANY, A CORPORATION OF NEW YORK.

METHOD OF CONNECTING ALTERNATING-CURRENT COMMUTATOR MOTORS.

Application filed May 19, 1922. Serial No. 562,234.

*To all whom it may concern:*

Be it known that I, PAUL MÜLLER, a subject of the German Republic, residing at 43 Kepplerstr., Charlottenburg, Germany, have invented certain new and useful Improvements in Methods of Connecting Alternating-Current Commutator Motors, of which the following is a specification.

My invention relates to an improvement in the connection of alternating-current commutator motors, which are connected in parallel and are fed across a common reactance. The improved connection is particularly applicable to electric locomotives or motor-coaches.

In such electric vehicles working with a plurality of alternating-current commutator motors connected in parallel and fed across a common reactance the drawback arises, that when the vehicles are moved by an external force in the opposite direction to the direction of travel for which they have been set, an extraordinary powerful braking action is set up. This is particularly inconvenient in shunting, when it is frequently necessary to move the vehicle backward.

The object of my invention is to remove this disadvantage by preventing the self-excitation.

The drawing represents the connections according to my invention. The essential difference between my invention and the prior art is that the coil $b$ of the reactance is made in two separate parts $b_1$, $b_2$ and that the half-coil $b_1$ is only connected with the motor $a_1$ and the half-coil $b_2$ only with the motor $a_2$. The exciting current flows besides through the coils $b_1$, $b_2$ of the reactance also through the motors $a_1$, $a_2$, while the work-performing current for each of the motors is introduced across the half-coil of the reactance belonging to it. A self-exciting current would then be obliged to pass across the half-coils $b_1$, $b_2$ of the reactance and the corresponding switches $c_1$, $c_2$ or $c_3$, $c_4$ respectively. As these connections are, however, interrupted during the backward motion of the locomotive or motor coach self-excitation cannot take place.

It will be readily understood that this improved method of connection is by no means limited to the case illustrated in the drawing with two motors connected in parallel. It may naturally equally well be applied when a larger number of motors connected in parallel are provided, for instance, when three motors work in parallel. In such a case the number of switches simultaneously closed and the number of separate coil portions of the reactance must be increased in the same proportion, so that in the case of three motors, assumed by way of example, three sets of switches and a reactance with a coil in three separate portions are required.

What I claim as my invention and desire to secure by Letters Patent is:

1. A motor drive consisting of a plurality of alternating current commutator motors, a transformer having a plurality of taps in its secondary, switches for connecting said motors in parallel to said transformer secondary and for changing the connections to different taps and a reactor having separate windings in each motor circuit between the motors and said switches.

2. An electric motor drive consisting of a plurality of alternating current commutator motors, a variable tap transformer secondary, means for connecting said motors in parallel to said transformer secondary, switches for changing the connections to different taps and a common reactor for said motors having separate coils inserted in the motor circuits between the said motors and said switches.

In testimony whereof I affix my signature.

PAUL MÜLLER.